Aug. 2, 1949.  D. B. BRABBIN  2,477,858
PNEUMATIC TIRE LIFTING MACHINE
Filed March 7, 1946  4 Sheets-Sheet 4

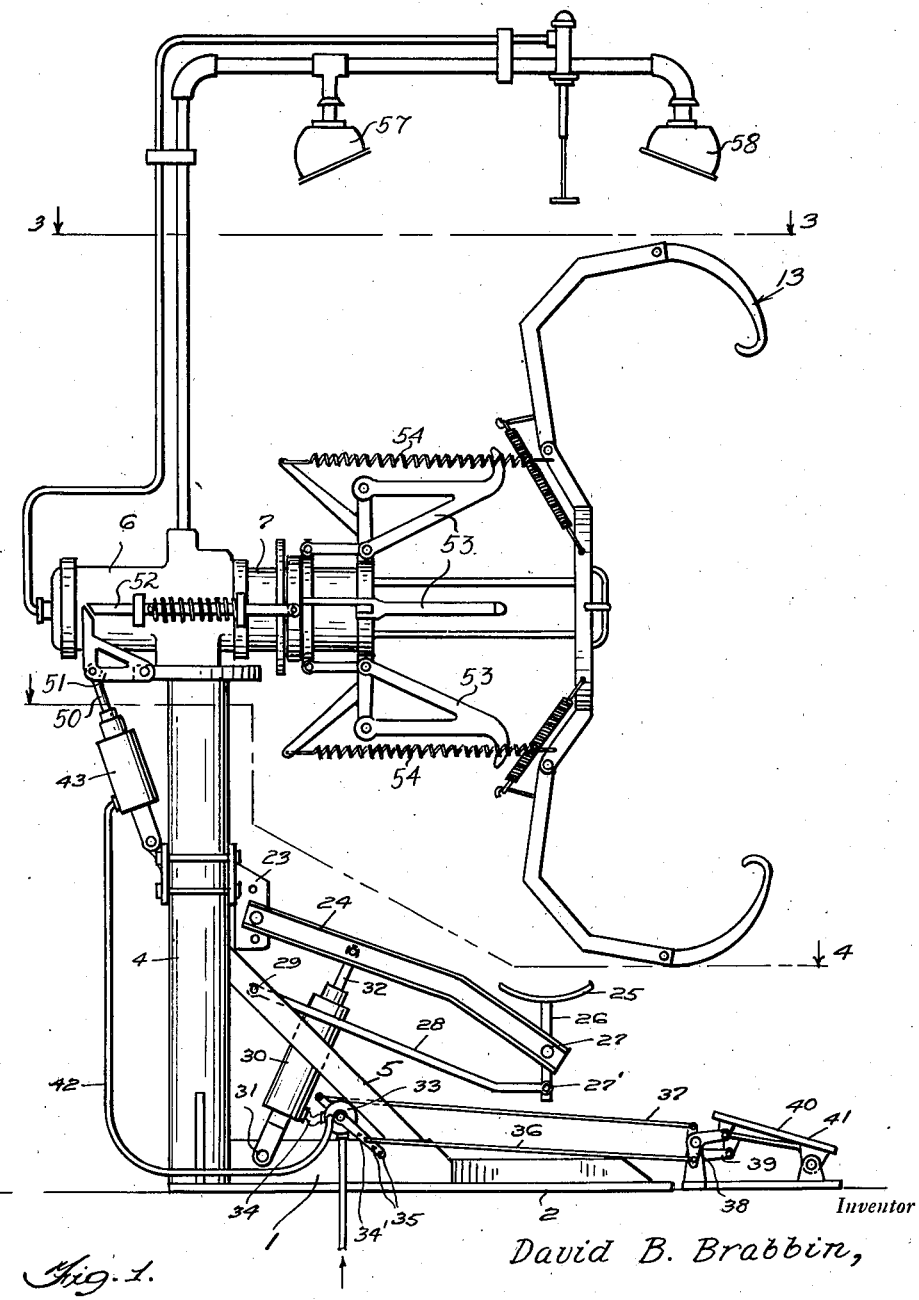

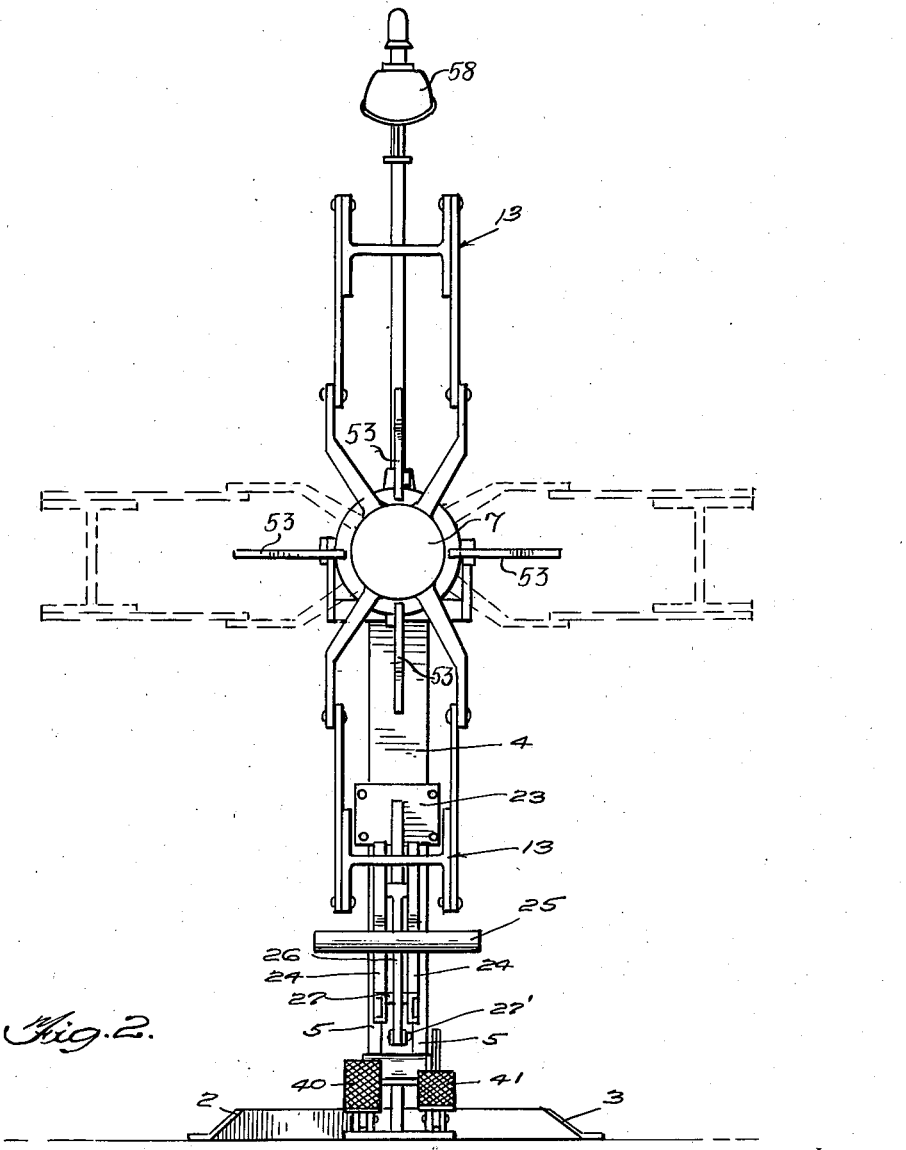

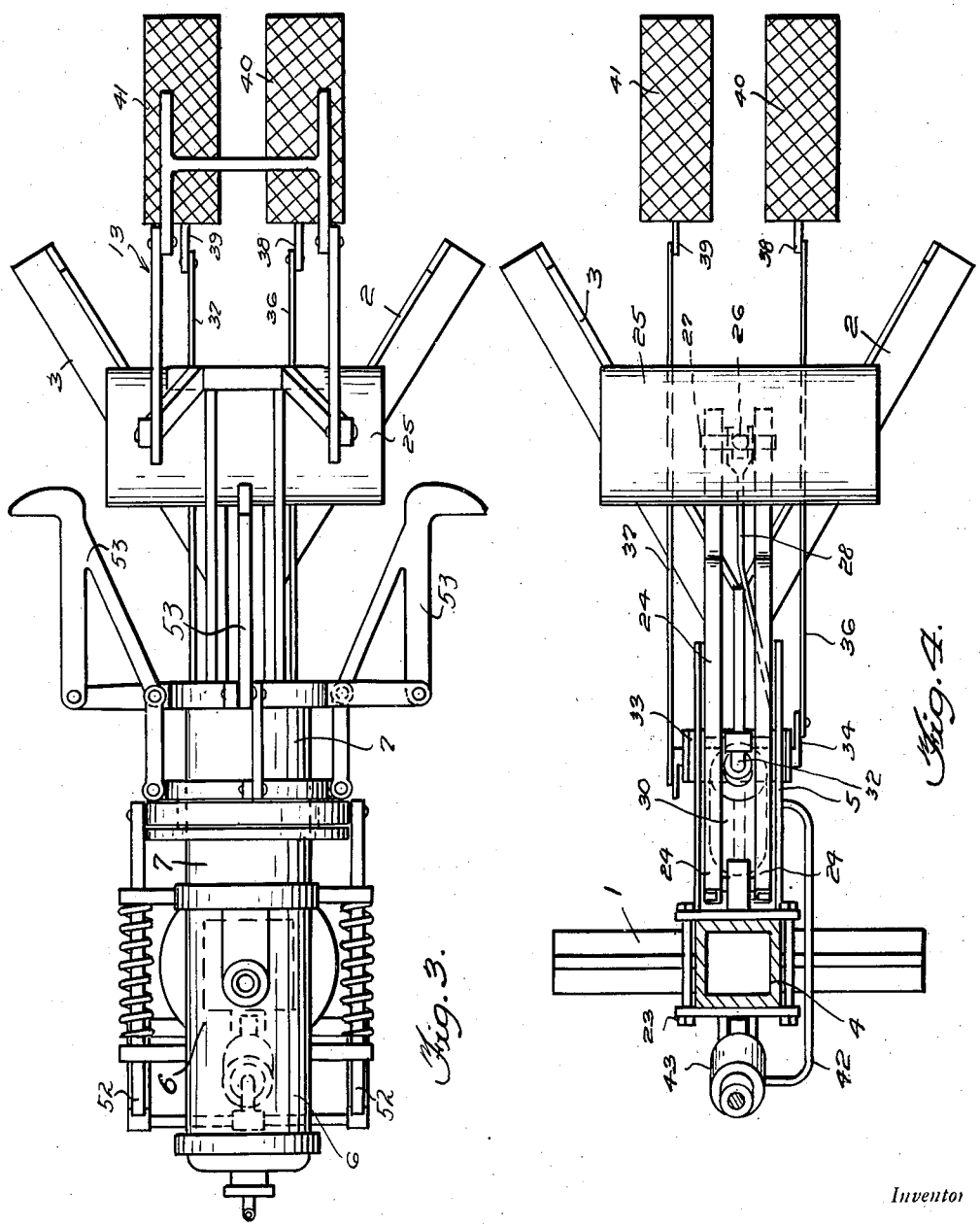

Inventor
David B. Brabbin,
By Clarence A. O'Brien
and Harvey B. Jacobson
Attorneys Patented Aug. 2, 1949

2,477,858

UNITED STATES PATENT OFFICE 2,477,858

PNEUMATIC TIRE LIFTING MACHINE

David B. Brabbin, Ashland, Oreg.

Application March 7, 1946, Serial No. 652,502

7 Claims. (Cl. 254—50.3)

This invention relates to improvements in pneumatic tire lifting machines.

An object of the invention is to provide an improved pneumatic tire lifting machine, which will be adapted to support a pneumatic tire casing and to lift it into position to be engaged by a tire casing spreading machine.

A further object of the invention is to provide an improved air operated lift for lifting large sizes of tire casings up from the ground level into position to be engaged by and supported in a tire casing spreading apparatus.

A still further object of the invention is to provide a one-man operable pneumatic tire lifting machine which will be highly efficient in operation, and relatively inexpensive to manufacture and produce.

Other objects will appear as the description proceeds.

In the accompanying drawings which form a part of this application:

Figure 1 is a side elevation of the improved pneumatic tire lifting machine applied to a tire spreading machine;

Figure 2 is a front elevation of the improved pneumatic tire lifting machine applied to a tire spreading machine;

Figure 3 is a view taken on the line 3—3 of Figure 1;

Figure 4 is a view taken on the line 4—4 of Figure 1; and

Like characters of reference are used throughout the following specification and the accompanying drawings to designate corresponding parts.

Figure 5:
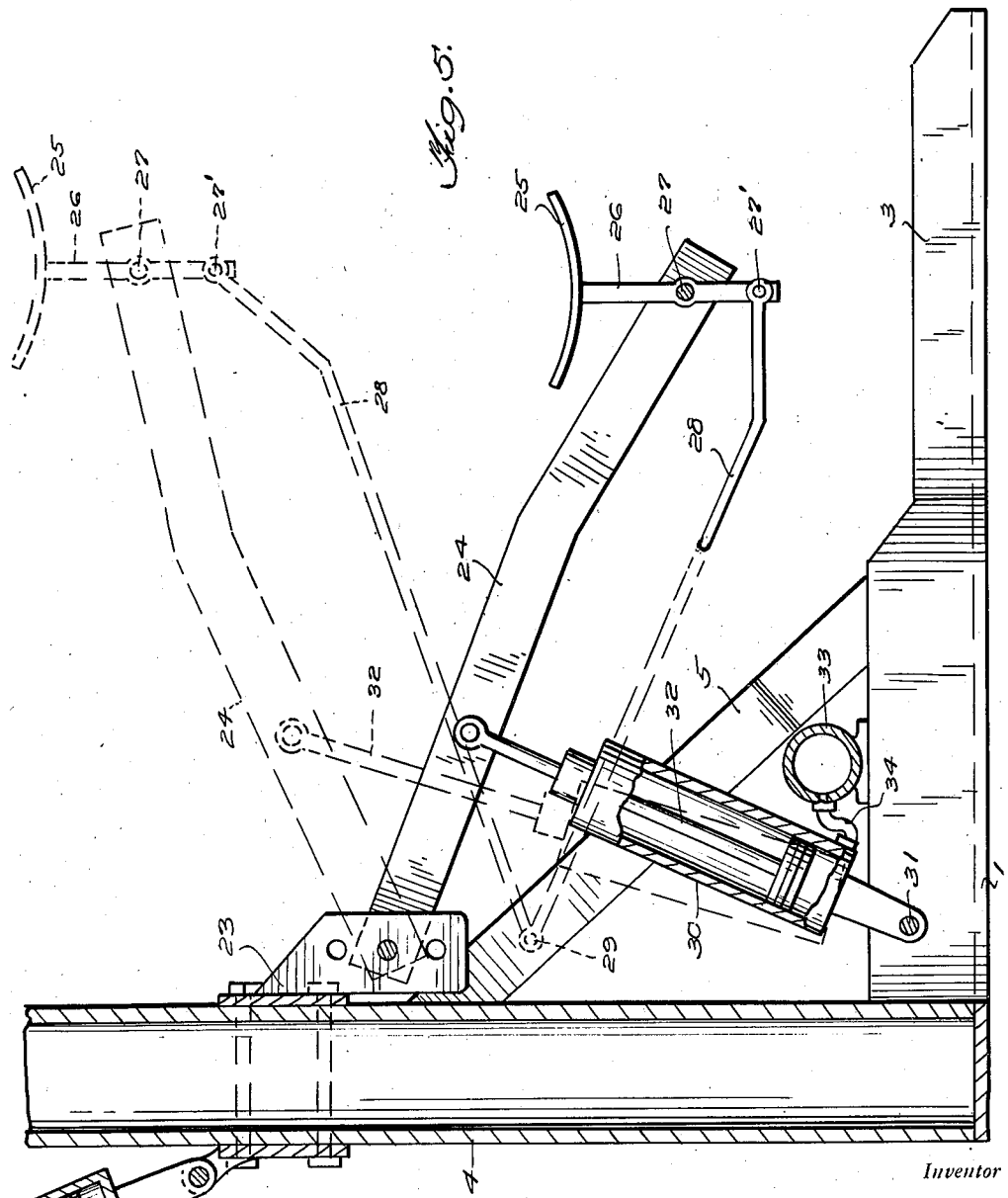
Figure 5 is a side elevation partly in section showing the pneumatic tire lifting apparatus in its lowered position, and shown in dotted lines in its raised position.

In carrying out the invention, there is provided a supporting base 1 having integrally formed outwardly extending legs 2 and 3 arranged in V-form.

An upwardly extending hollow standard 4 is suitably secured to said base 1, and is substantially square in cross section. Spaced angularly disposed bracing arms 5 are secured between the base 1 and the standard 4 to provide reinforcement for the assembly.

Mounted on top of the standard 4 is a pneumatic cylinder 6, adapted to support a piston 7 upon the end of which is mounted any desired form of tire casing spreading apparatus generally denoted by the reference numeral 13.

A bracket 23 will be secured to the standard 4 and will pivotally support the pair of arms 24 which are U-shaped in cross section. A tire casing supporting arcuate seat 25 is secured to the rod 26, which is provided with a cross-pin 27 extending between the outer ends of said arms 24. The rod 26 extends below the arms 24 and is pivotally connected at 27' to the guide rod 28 pivoted at its opposite end at 29 between the brace members 5.

A pneumatic cylinder 30 is pivotally supported at 31 to the base 1, and is provided with a piston and piston rod 32, which is connected between the arms 24 to elevate said arms and tire casing seat 25 when air is admitted to said cylinder.

A three-way air control valve 33 is secured on the base 1, and is connected by the hose 34 to the pneumatic cylinder 30. The valve 33 is provided with the oppositely extending operating arms 34' which are apertured at 35 to permit adjustability of the connecting rods 36 and 37, the same being connected to links 38 and 39 on the treadle members 40 and 41. The treadle 40 will operate the valve 33 to admit air to the cylinder 30 for operating the tire casing lift.

The treadle 41 will operate the valve 33 to admit air through the hose 42 to a second cylinder 43 secured to the bracket 23 on the standard 4, to operate the tire casing spreading apparatus 13.

The piston rod 50 connected with the piston 50' in the cylinder 43 will be connected with the bell crank operating levers 51 which will engage in certain of the slidable levers 52 connected through suitable linkage with the bell crank arms 53 and associated springs 54 for actuating the entire spreading apparatus or fingers 13 when air pressure is admitted into the rear end of the piston 6 to force the piston 7 outwardly, to positively actuate the said tire spreading apparatus or fingers 13.

Suitable lamps 57 and 58 will be connected with a source of electric current supply (not shown) and will be disposed above the tire spreading apparatus to provide illumination for operating the same in places where daylight is not available.

From the foregoing description, it will be apparent that one man may operate the improved pneumatic tire lifting and also spreading machine. As is often the case, a tire casing of large size will have to be spread for inspection purposes, and one man will be unable to lift the same into a spreading machine. However, one man will be able to roll the tire onto the tire supporting seat of the instant invention and will support it there while stepping on the treadle 40 to admit air to the pneumatic cylinder to elevate the said tire and seat into position where it will be engaged and supported by the tire casing spreading apparatus 13, whereupon the operator will then step upon the treadle 41 to operate the spreading apparatus to cause the tire casing to be spread.

It will therefore be apparent that there has been devised a highly efficient form of pneumatic tire lifting machine, which will be operable by one man, thus saving a considerable amount of time and one man's labor when a large tire is to be lifted and spread for inspection.

While the preferred embodiment of the invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A pneumatic tire lifting and spreading machine including a base, a standard supported thereon, a tire spreading apparatus supported on said standard, a pair of arms pivotally supported on said standard below and in vertical alignment with said tire spreading apparatus, a tire casing supporting seat pivotally supported between the outer ends of said arms, and pneumatic means for elevating said arms and seat for lifting a tire casing upwardly in position to be engaged and supported by a tire spreading apparatus.

2. A pneumatic tire lifting and spreading machine including a base, a standard supported thereon, a tire spreading apparatus supported on said standard, a pair of arms pivotally supported on said standard below and in vertical alignment with said tire spreading apparatus, a tire casing supporting seat pivotally supported between the outer end of said arms, a guide rod extending parallel to said pair of arms and pivotally attached to said tire casing supporting seat, pneumatic means for elevating said arms and seat for lifting a tire casing upwardly in position to be engaged and supported by tire spreading apparatus, and a valve for controlling the operation of said pneumatic means.

3. A pneumatic tire lifting and spreading machine including a base, a standard supported thereon, a tire spreading apparatus supported on said standard, a pair of arms pivotally supported on said standard below and in vertical alignment with said tire spreading apparatus, a tire casing supporting seat pivotally supported between the outer end of said arms, a guide rod extending below and parallel to said pivoted arms being pivotally connected with said tire casing supporting seat, pneumatic means for elevating said arms and seat for lifting a tire casing upwardly in position to be engaged and supported by said tire spreading apparatus, and a treadle operated valve for controlling the operation of said pneumatic means.

4. A pneumatic tire lifting and spreading machine including a base, a standard supported thereon, a tire spreading apparatus supported on said standard, a pneumatic tire lifting device disposed below and in vertical alignment with said tire spreading apparatus for lifting a tire casing upwardly in position to be engaged and supported by said tire spreading apparatus, a guide rod pivotally connected with said tire lifting device, pneumatic means for operating said tire spreading apparatus and said tire lifting apparatus, and means for selectively operating either of said last mentioned means.

5. A pneumatic tire lifting and spreading machine including a base, a standard supported thereon, a tire spreading apparatus supported on said standard, a pneumatic tire lift disposed below and in vertical alignment with said tire spreading apparatus for lifting a tire casing upwardly in position to be engaged and supported by said tire spreading apparatus, a guide rod pivotally connected with said tire lift, pneumatically operated cylinders and pistons connected with said tire spreading apparatus and said tire lift for operating the same and a three-way valve mechanism associated with said cylinders for selectively operating the pistons therein.

6. The combination as claimed in claim 5, and separate pedals operatively connected with said three-way valve for admitting air to either of said cylinders for causing the operation of said mechanism.

7. The subject matter as claimed in claim 5, and independently operated pedals connected with said three-way valve for first causing the operation of said tire lift, and then for causing the operation of said tire spreading apparatus.

DAVID B. BRABBIN.

REFERENCES CITED

The following references are of record in the file of this patent:

UNITED STATES PATENTS

| Number | Name | Date |
|---|---|---|
| 1,288,733 | Stevens | Dec. 24, 1918 |
| 1,943,784 | Branick | Jan. 16, 1934 |
| 2,167,981 | Kalbfleisch | Aug. 1, 1939 |
| 2,375,595 | Stoehr | May 8, 1945 |